Patented Apr. 19, 1932

1,855,131

UNITED STATES PATENT OFFICE

HENRY DREYFUS, OF LONDON, ENGLAND

TREATMENT OF MATERIALS MADE OF OR CONTAINING CELLULOSE DERIVATIVES

No Drawing. Original application filed January 22, 1927, Serial No. 162,938, and in Great Britain November 23, 1926. Divided and this application filed January 8, 1930. Serial No. 419,457.

This application, which is divided from my co-pending application, Serial No. 162,938, filed January 22, 1927, relates to the dyeing, printing or stencilling of threads, yarns, knitted or woven fabrics or other products made of or containing cellulose acetate or other organic acid esters of cellulose, such for example as cellulose formate, propionate or butyrate, or the product obtained by the treatment of alkalized cellulose with para-toluene sulhochloride (e. g. the product known as "immunized cotton"), or made of or containing cellulose ethers, such as methyl, ethyl or benzyl cellulose, or the corresponding condensation products of cellulose and glycols or other polyhydric alcohols, all of which cellulose derivatives are hereinafter referred to as organic substitution derivatives of cellulose.

According to this invention materials made of or containing one or more organic substitution derivatives of cellulose are dyed or otherwise coloured with colouring matters or compounds comprising one or more uera, thiourea or substituted urea or thiourea groups, that is to say colouring matters containing at least one —NH.CX.NHR group, X representing oxygen or sulphur and R a hydrogen atom or an aliphatic organic radicle.

Further according to the present invention such colouring matters may be formed on the fibre or material by combination of components, one or more of which contain such urea, thiourea or substituted urea or thiourea residues.

The compounds for use according to the present invention may be prepared by any convenient method. Thus for example the groups characteristic of the invention may be introduced into a compound containing an amino group by heating it, for example in the form of its hydrochloride, with an inorganic or organic thiocyanate or cyanate, e. g. ammonium or potassium thiocyanates or cyanates. The urea or thiourea derivatives may of course be prepared by other methods, for example by treating the compound containing an aryl dye nucleus or component thereof containing an animo group with a urea halide or substituted urea halide.

The following examples or colouring matters or compounds for use according to the present invention and of the methods of preparing them are intended to be illustrative and not in any way limitative:—

A. ANTHRAQUINONE DYESTUFFS

*Example 1*

A solution of α-aminoanthraquinone hydrochloride is heated with potassium thiocyanate to obtain a dyestuff having the formula

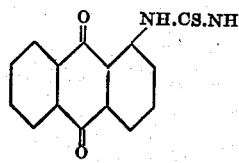

By substituting an organic thiocyanate such as ethyl isothiocyanate or allyl isothiocyanate for the potassium thiocyanate, substituted anthraquinonyl thioureas may be obtained. Thus by heating with ethyl isothiocyanate the dyestuff

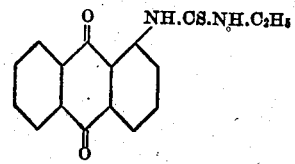

is produced, while by using allyl isothiocyanate and heating, the dyestuff

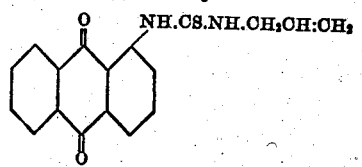

is obtained.

Two further thiocyanate groups may be introduced into compounds containing an ethylenic linkage, such as the above allyl derivative, by treatment with chlorine and a thiocyanate.

For the thiocyanate, inorganic or organic, used in Example 1 an inorganic or organic cyanate may be substituted so as to obtain the corresponding isocyanate and urea derivatives.

B. Azo Dyestuffs

Example 2

Aniline is coupled with α-naphthylamine and the product diazotized and coupled with o-oxyphenyl urea (obtained by heating o-oxyaniline hydrochloride with potassium cyanate) to give the dyestuff

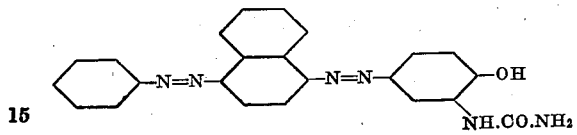

C. Dyestuffs Produced on the Material

Example 3 m-aminophenylurea is first prepared by heating an ethereal solution of m-nitraniline with moist cyanogen chloride, separating the product and reducing. It is diazotized and coupled with aniline. Cellulose acetate artificial silk fabric is dyed with the product from a solution of its hydrochloride and the dyestuff is then diazotized and coupled with o-oxyphenyl-urea.

D. Miscellaneous Dyestuffs

Example 4

3.3'-dinitro-4.4'-diaminodiphenyl hydrochloride is heated with potassium cyanate to obtain the dyestuff

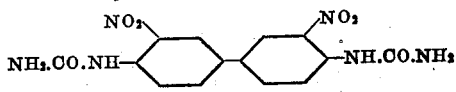

Example 5

3.3'-dinitro-4.4'-diaminodiphenylmethane hydrochloride is similarly treated with potassium cyanate to yield the dyestuff

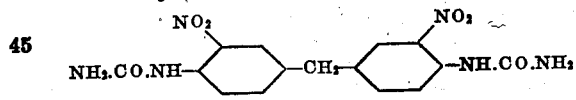

The dyestuffs where sufficiently soluble may be applied in aqueous solution. When however they are not sufficiently soluble they may be applied to the materials in aqueous suspension or in colloidal solutions or dispersions obtained by grinding (for example in colloid mills), by dissolving in a solvent and pouring into water containing or not containing protective colloids, by pretreating the coloring matters or compounds with solubilizing agents or by other methods. Of the solubilizing agents which are suitable for obtaining such dispersions I may mention those described in U. S. Patents Nos. 1,618,413, 1,618,414, 1,694,413, 1,716,721 and 1,840,572; viz. bodies of oily or fatty characteristics, namely higher fatty acids or sulphonated or other derivatives thereof containing salt forming groups, such as sulphoricinoleic acid or other sulphonated fatty acids or salts of such acids or bodies, for instance their alkali or ammonium salts, used alone or in conjunction with auxiliary solvents as described in U. S. Patents Nos. 1,690,481 and 1,803,008; carbocyclic compounds containing in their structure one or more salt forming groups or salts of such compounds; sulpho-aromatic fatty acids including sulpho-aromatic ricinoleic acids such as sulpho benzene ricinoleic acid, sulpho phenol ricinoleic acid or sulpho napththalene ricinoleic acid or salts thereof; and soluble resin soaps or sodium or other soluble salts of resin acids.

Though coloring matters and compounds belonging to particular groups have been described above, it is to be understood that the invention is not limited to coloring matters or compounds of these groups, but comprises broadly the application to materials made of or containing cellulose acetate or other of the herein described organic substitution derivatives of cellulose of any coloring matters or compounds in which an aryl dye nucleus or component thereof is linked either directly or indirectly to one or more urea, thiourea or substituted urea or thiourea residues. In the case of using components of aryl dye nuclei the actual colouring matters may be produced on the fibre or material.

Mixed goods containing for example, in addition to the organic substitution derivative or derivatives of cellulose, cotton, silk, wool, or the cellulose type of artificial silk or other fibres or threads, may be dyed or otherwise colored with or without employment of other dyestuffs or components according to the character of the threads or fibres used in association, said other dyestuffs or components being applied if desired before or after the application of the coloring matters or compounds of the present invention, or when not deleteriously affected thereby, they may be applied in conjunction therewith.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one —NH.CX.NHR group, X representing oxygen or sulphur and R a hydrogen atom or an aliphatic organic radicle.

2. Process for dyeing material comprising an organic substitution derivative of cellulose, comprising dyeing the material from an aqueous medium with a coloring compound which comprises at least one —NH.CX.NHR group, X representing oxygen or sulphur and R a hydrogen atom or an aliphatic organic radicle.

3. Process for dyeing material comprising an organic substitution derivative of cellulose, comprising dyeing the material with an anthraquinone coloring compound which comprises at least one —NH.CX.NHR group, X representing oxygen or sulphur and R a hydrogen atom or an organic radicle.

4. Process for dyeing material comprising an organic substitution derivative of cellulose, comprising dyeing the material from an aqueous medum with an aqueous solution of an anthraquinone coloring compound which comprises at least one —NH.CX.NHR group, X representing oxygen or sulphur and R a hydrogen atom or an aliphatic organic radicle.

5. Process for dyeing material comprising cellulose acetate, comprising dyeing the material with a coloring compound which comprises at least one —NH.CX.NHR group, X representing oxygen or sulphur and R a hydrogen atom or an aliphatic organic radicle.

6. Process for dyeing material comprising cellulose acetate, comprising dyeing the material from an aqueous medium with a coloring compound which comprises at least one —NH.CX.NHR group, X representing oxygen or sulphur and R a hydrogen atom or an aliphatic organic radicle.

7. Process for dyeing material comprising cellulose acetate, comprising dyeing the material with an anthraquinone coloring compound which comprises at least one

—NH.CX.NHR group, X representing oxygen or sulphur and R a hydrogen atom or an aliphatic organic radicle.

8. Process for dyeing material comprising cellulose acetate, comprising dyeing the material from an aqueous medium with an anthraquinone coloring compound which comprises at least one —NH.CX.NHR group, X representing oxygen or sulphur and R a hydrogen atom or an aliphatic organic radicle.

9. Material comprising an organic substitution derivative of cellulose, dyed with a coloring compound which comprises at least one —NH.CX.NHR group, X representing oxygen or sulphur and R a hydrogen atom or an aliphatic organic radicle.

10. Material comprising cellulose acetate, dyed with a coloring compound which comprises at least one —NH.CX.NHR group, X representing oxygen or sulphur and R a hydrogen atom or an aliphatic organic radicle.

In testimony whereof I have hereunto subscribed my name.

HENRY DREYFUS.

CERTIFICATE OF CORRECTION.

Patent No. 1,855,131.  Granted April 19, 1932, to

HENRY DREYFUS.

It is hereby certified that error appears in the printed specification of the above numbered patent requiring correction as follows: Page 3, line 12, claim 3, before the word "organic" insert the word aliphatic; same page, line 16, claim 4, strike out the words "an aqueous solution of"; and that the said Letters Patent should be read with these corrections therein that the same may conform to the record of the case in the Patent Office.

Signed and sealed this 7th day of June, A. D. 1932.

M. J. Moore,
Acting Commissioner of Patents.

(Seal)